US010255106B2

(12) United States Patent
Farazmand et al.

(10) Patent No.: US 10,255,106 B2
(45) Date of Patent: Apr. 9, 2019

(54) PREDICTION-BASED POWER MANAGEMENT STRATEGY FOR GPU COMPUTE WORKLOADS

(71) Applicant: QUALCOMM Incorporated, San Diego, CA (US)

(72) Inventors: Navid Farazmand, Marlborough, MA (US); Eduardus Antonius Metz, Unionville (CA); David Rigel Garcia Garcia, North York (CA)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 15/007,643

(22) Filed: Jan. 27, 2016

(65) Prior Publication Data
US 2017/0212563 A1 Jul. 27, 2017

(51) Int. Cl.
G06F 9/50 (2006.01)
G06F 1/329 (2019.01)
G06F 1/3234 (2019.01)

(52) U.S. Cl.
CPC .......... G06F 9/5027 (2013.01); G06F 1/329 (2013.01); G06F 1/3243 (2013.01); G06F 9/5094 (2013.01); Y02D 10/152 (2018.01); Y02D 10/22 (2018.01); Y02D 10/24 (2018.01)

(58) Field of Classification Search
None
See application file for complete search history.

(56) References Cited

U.S. PATENT DOCUMENTS

| 8,650,423 | B2 | 2/2014 | Li et al. | |
|---|---|---|---|---|
| 2008/0098254 | A1 | 4/2008 | Altevogt et al. | |
| 2009/0122068 | A1* | 5/2009 | Garritsen | G09G 3/003 345/522 |
| 2013/0097415 | A1 | 4/2013 | Li et al. | |
| 2013/0205299 | A1 | 8/2013 | Shin et al. | |
| 2014/0143565 | A1* | 5/2014 | Paul | G06F 1/206 713/320 |
| 2015/0121105 | A1 | 4/2015 | Ahn et al. | |
| 2016/0054782 | A1* | 2/2016 | Kaburlasos | 713/320 |
| 2017/0206169 | A1* | 7/2017 | Coppola | G06F 9/44505 |

FOREIGN PATENT DOCUMENTS

WO 2014123587 A1 8/2014

OTHER PUBLICATIONS

Hong S., et al., "An Integrated GPU Power and Performance Model," Proceedings of the 37th Annual International Symposium on Computer Architecture, ISCA 10, Jun. 19, 2010, pp. 280-289, XP058174464.
International Search Report and Written Opinion—PCT/US2016/066600—ISA/EPO—dated Mar. 2, 2017, 12 pages.
(Continued)

Primary Examiner — Kim Huynh
Assistant Examiner — Joshua Neveln
(74) Attorney, Agent, or Firm — Shumaker & Sieffert, P.A.

(57) ABSTRACT

A device for processing data includes a processing unit configured to predict an execution time of a compute kernel on a secondary processing unit and, based on the predicted execution time, make a power management decision for the secondary processing unit.

14 Claims, 8 Drawing Sheets

(56) References Cited

OTHER PUBLICATIONS

Ma K., et al., "GreenGPU: A Holistic Approach to Energy Efficiency in GPU-CPU Heterogeneous Architectures," International Conference on Parallel Processing (ICPP), 2012, 10 pages.
Pai, et al., "Preemptive Thread Block Scheduling with Online Structural Runtime Prediction for Concurrent GPGPU Kernels," Feb. 25, 2014, PACT 2014; 14 pp.
Second Written Opinion—PCT/US2016/066600 dated Dec. 20, 2017 6 pages.
International Preliminary Report on Patentability from International Application No. PCT/US2016/06660, dated May 3, 2018, 17 pp.

\* cited by examiner

PREDICTION-BASED POWER MANAGEMENT STRATEGY FOR GPU COMPUTE WORKLOADS

TECHNICAL FIELD

The disclosure relates to processor power management.

BACKGROUND

Parallel programming models may support one or both of task-parallelism and data-parallelism in order to solve computational problems. Task-parallelism may allow computational problems to be divided up into multiple tasks. The tasks may be executed sequentially, concurrently, and/or in parallel on one or more processor cores. Data-parallelism may allow the same set of operations to be performed in parallel on different sets of data by distributing the data to different processing elements and causing each of the processing elements to perform the same set of operations on their assigned set of data.

Multi-core processors may be used to support task-parallelism where each core is configured to execute a particular task. In some cases, one or more of the cores in a multi-core processor may be a single instruction, multiple data (SIMD) processor or a single program, multiple data (SPMD) processor that may include multiple processing elements to support data-parallelism. In such cases, tasks that support data-level parallelism may be able to be executed either sequentially or in parallel on a multi-core processor.

Several different types of processors may support task-parallelism and/or data-parallelism including a multi-core central processing unit (CPU), a graphics processing unit (GPU), a digital signal processor (DSP), a Cell Broadband Engine (Cell/B.E.) processor, etc. Although GPUs were traditionally designed to support the rendering of three-dimensional (3D) graphics to a display, the programmable shader architecture included in many modern GPUs can be used to efficiently support both task-parallelism and data-parallelism found in general-purpose, non-graphics specific programs that are programmed using a parallel programming model. Using the parallel architecture of a GPU to execute non-graphics specific programs may be referred to as general-purpose computing on graphics processing units (GPGPU).

SUMMARY

This disclosure describes power management techniques for processing units processing compute workloads.

In one example, a method of processing data on a secondary processing unit includes predicting an execution time of a compute kernel on the secondary processing unit; and based on the predicted execution time, making a power management decision for the secondary processing unit.

In another example, a device for processing data includes a processing unit configured to predict an execution time of a compute kernel on a secondary processing unit and, based on the predicted execution time, make a power management decision for the secondary processing unit.

In another example, an apparatus for processing data includes means for predicting an execution time of a compute kernel on the secondary processing unit and means for making a power management decision for the secondary processing unit based on the predicted execution time.

In another example, a computer-readable medium storing instructions that when executed by one or more processors cause the one or more processors to predict an execution time of a compute kernel on the secondary processing unit and make a power management decision for the secondary processing unit based on the predicted execution time.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
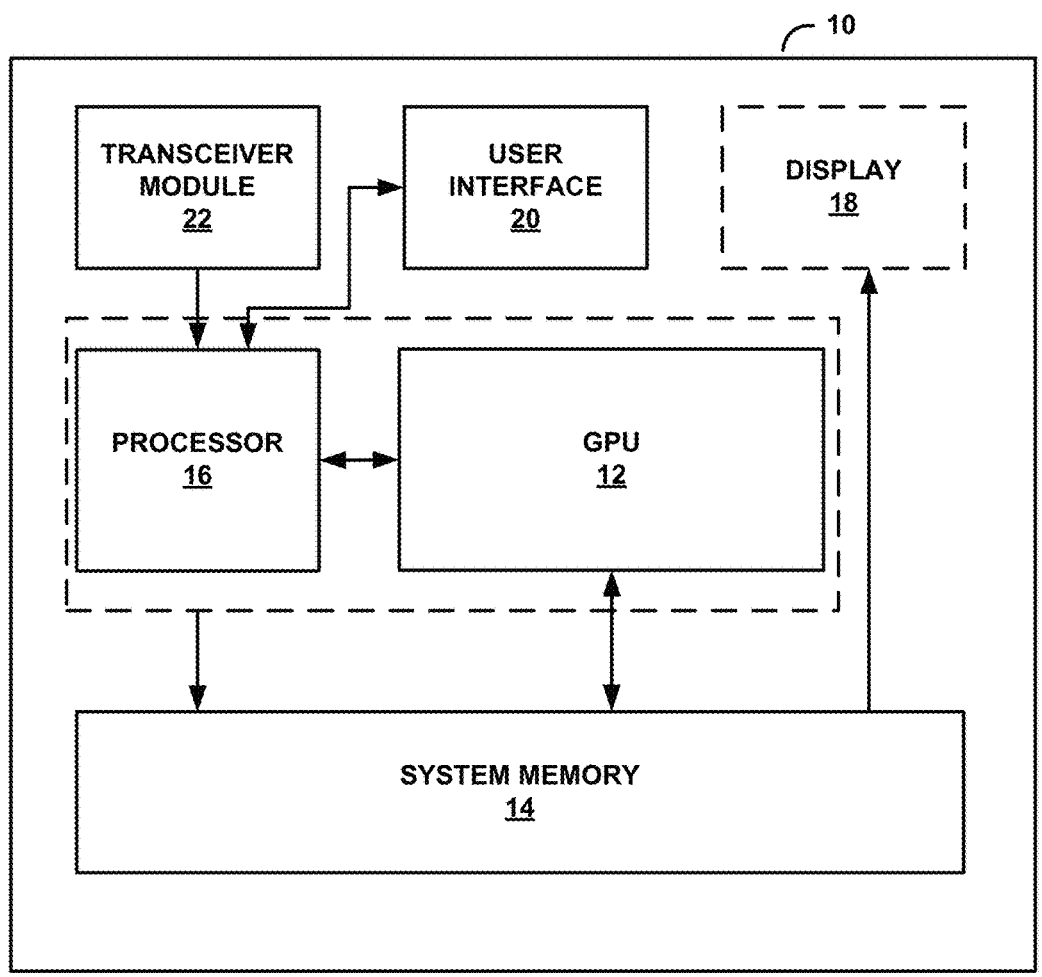
FIG. 1 is a block diagram illustrating a device that may be configured to implement the techniques of this disclosure.

There are various techniques such as Dynamic Clock and Voltage Scaling (DCVS) and inter-domain power collapse that can be employed to reduce power (energy) consumption of a given application running on a (mobile) GPU while maintaining certain performance requirements. For graphics applications, various algorithms exist for determining when to put the GPU into a low power mode, such as a power collapse mode, based on one or more target performance metrics, such as a frame rate of the video to be generated. Inter-frame power collapse of certain GPU hardware blocks is a technique used by GPUs during graphics processing, but such a technique is not easily extendable to or compatible with compute workloads processed on a GPU. For compute workloads, i.e. non-graphics workloads, being executed on a GPU, however, easily identifiable target performance metrics such as frame rate cannot be used.

Additionally, for graphics applications, various techniques exist that can save energy by reducing voltage and frequency when such reductions may still result in a desired performance level. As with power collapse mode, voltage and/or frequency adjustment techniques are not easily extendable to or compatible with compute workloads processed on a GPU. This disclosure describes techniques for the adjusting of voltage and/or frequency of a GPU and/or for the power collapse, e.g. shutting down, of GPU blocks that are unused while a compute workloads is being executed. In this regard, the techniques of this disclosure may be unique to the running of compute workloads on a GPU (and hence present a power saving opportunity that is unique to GPGPU and which does not apply to graphics workloads).

This disclosure proposes a framework for predicting the execution time of a compute kernel. A computing system may use the predicted execution time of the kernel as an input for various power saving techniques. Thus, according to the techniques of this disclosure, a computing system may make power management decisions for compute workloads being executed by a secondary processor, such as a GPU, of the computing system.

A kernel may define a function or task that is performed by the GPU. In order to execute a kernel, the program code is divided into work items (e.g., a basic unit of work in a GPU), which are organized into one or more workgroups (e.g., a set of work items). A work item may be analogous to a thread in graphics processing and a workgroup may be analogous to a warp. Some applications may include multiple kernels for carrying out multiple functions on the same input data. Further, applications having multiple kernels may include some kernels that are dependent on other kernels. For example, an application may include two kernels, with a second kernel that is dependent on the results of the first kernel.

This disclosure introduces techniques for using performance counters to measure the processing time for a compute kernel, or portion thereof, as part of a profiling phase. Based on the measured processing times and other information available at compile time or kernel launch time, a system may predict total execution time of the kernel. An example of such other information may be the number of workgroups in a kernel or number of kernels in a virtual frame, where a virtual frame is a virtual construct for converting compute workloads that are theoretically unbounded and non-periodic, into execution units with associated (e.g. implied) deadline or performance requirements.

This disclosure describes two separate techniques for the profiling phase. The first technique includes kernel level profiling, and the second technique includes sub-kernel level. Both techniques calculate average execution clock cycles per workgroup for a specific kernel with different granularities. Total execution cycles for the kernel can subsequently be calculated by multiplying the estimated workgroup cycles by the total number of workgroups in the kernel. The prediction model can be described by the following equation:

$$\text{Kernel}_{exec_{cycle}} = WG_{exec_{cycle}} * \text{Num}_{wg} + \text{constant}_{overhead} + \varepsilon$$

Kernel level profiling measures the total execution cycles of a kernel, and divides the total execution cycles by the number of workgroups in the kernel to estimate average workgroup execution cycles. The calculated average workgroup execution cycles can be used to predict execution cycles for the subsequent runs of the kernel. The calculated average workgroup execution cycles may also be updated according to the actual average workgroup execution cycles in those subsequent runs to account for system level variability effects as well as variations related to the dynamic nature of the application. Sub-kernel level profiling measures the execution cycles of the first few workgroups of a kernel and calculates the average execution cycles of a workgroup. The number of workgroups to be used for profiling is a tunable parameter, equal to or greater than the number of workgroups that can be executed in parallel, depending on the available hardware resource.

The constant_overhead term in the above equation can be tuned to account for various kernel startup times including (but not limited to) cache warmup, and GPU state setup. The variable $\varepsilon$ accounts for estimation error and can be used for updating predicted execution cycles iteratively.

Either of the two profiling techniques can be used separately as they calculate the same parameter with different granularity. Each of the two technique may have its own advantages and disadvantages, and in some implementations, the two techniques may be combined together to potentially achieve better results.

While not limited to mobile GPUs, the techniques of this disclosure may offer particular benefits to mobile GPUs. The nature of the work performed by desktop GPUs and mobile GPUs is frequently different, with desktop GPUs typically running longer duration tasks than mobile GPUs. With longer duration tasks, the decisions with regards to entering and exiting power savings modes can be made more slowly than with short duration tasks, where such decisions need to be made relatively quickly or else the use of such modes may reduce system performance and even potentially increase power consumption rather than reduce power consumption. As mobile devices typically rely on battery power, reducing power consumption, and thus extending battery life, may significantly improve overall user experience.

FIG. 1 is a block diagram illustrating an example device that may implement the techniques of this disclosure for prediction-based power management strategy for GPU compute workloads. FIG. 1 illustrates device 10 that includes GPU 12, system memory 14, and processor 16, which may be a central processing unit (CPU). Examples of device 10 include, but are not limited to, video devices such as media players, set-top boxes, wireless handsets such as mobile telephones, personal digital assistants (PDAs), desktop computers, laptop computers, gaming consoles, video conferencing units, tablet computing devices, and other such devices. Device 10 may include components in addition to those illustrated in FIG. 1.

System memory 14 may be considered as the memory for device 10. System memory 14 may comprise one or more computer-readable storage media. Examples of system memory 14 include, but are not limited to, a random access memory (RAM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause processor 16 and/or GPU 12 to perform the functions ascribed to processor 16 and GPU 12 in this disclosure. Accordingly, system memory 14 may be a computer-readable storage medium having instructions stored thereon that, when executed, cause one or more processors (e.g., processor 16 and GPU 12) to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable or that its contents are static. As one example, system memory 14 may be removed from device 10, and moved to another device. As another example, memory, substantially similar to system memory 14, may be inserted into device 10. In certain examples, a non-transitory storage medium may store data that can, over time, change (e.g., in RAM).

In some examples, such as examples where device 10 is a wireless handset communication device, processor 16 and GPU 12 may be formed in an integrated circuit (IC). For example, the IC may be considered as a processing chip within a chip package or may be considered to be a system on a chip or portion thereof. In some examples, processor 16 and GPU 12 may be housed in different integrated circuits (i.e., different chip packages) such as examples where device 10 is a desktop or laptop computer. However, it may be possible that processor 16 and GPU 12 are housed in different integrated circuits in examples where device 10 is a wireless handset communication device.

Examples of processor 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing capabilities, and may be referred to as a general purpose GPU (GPGPU) when implementing general purpose processing tasks (i.e., non-graphics related tasks).

Processor 16 may execute various types of applications. Examples of the applications include web browsers, e-mail applications, spreadsheets, video games, or other applications that generate viewable objects for display. Instructions for execution of the one or more applications may be stored within system memory 14. Processor 16 may transmit graphics data of the viewable objects to GPU 12 for further processing.

For instance, processor 16 may offload processing tasks to GPU 12, such as tasks that require massive parallel operations. As one example, graphics processing requires massive parallel operations, and processor 16 may offload such graphics processing tasks to GPU 12. Processor 16 may communicate with GPU 12 in accordance with a particular application processing interface (API). Examples of such APIs include the DirectX® API by Microsoft®, the OpenGL® API by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and processor 16 and GPU 12 may utilize any technique for communication.

To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shader programs (or simply shaders), and the shader programs may execute on one or more shader cores of GPU 12. Shader programs provide users with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

For example, processor 16 may execute an application, such as a video game, and processor 16 may generate graphics data as part of the execution. Processor 16 may output the graphics data for processing by GPU 12. GPU 12 may then process the graphics data in the graphics pipeline. In some examples, to process the graphic data, GPU 12 may need to execute one or more shader programs. For example, the application executing on processor 16 may cause processor 16 to instruct GPU 12 to retrieve a shader program from system memory 14 and instruct GPU 12 to execute the shader program.

GPU 12 may also be configured to execute commands that are issued to GPU 12 by processor 16. The commands executed by GPU 12 may include general-purpose computing commands, task execution commands (e.g., kernel execution commands), memory transfer commands, etc. GPU 12 may be configured to perform general-purpose computing for applications executing on processor 16. For example, when a host program, which is executing on processor 16, decides to off-load a computational task to GPU 12, processor 16 may provide general-purpose computing data to GPU 12, and issue one or more general-purpose computing commands to GPU 12. The general-purpose computing commands may include, e.g., kernel execution commands, memory transfer commands, etc. In some examples, processor 16 may provide the commands and general-purpose computing data to GPU 12 by writing the commands and data to system memory 14, which may be accessed by GPU 12.

GPU 12 may also be configured to operate in one or more low power modes or implement one or more power management mechanisms in order to reduce power consumption. An example of one such power management mechanism is DCVS, where device 10 may conserve power by reducing the clock rate and operating voltage of GPU 12. An example of another such low power mode is a power collapse mode, where GPU 12 may power down (e.g., cut power to) certain blocks when not being used. GPU 12 may, for example, power down hardware blocks that are not required for a particular compute operation (e.g., hardware blocks dedicated to performing graphics operations).

Device 10 may also optionally include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication. Display 18 may comprise a liquid crystal display (LCD), a cathode ray tube (CRT) display, a plasma display, a touch-sensitive display, a presence-sensitive display, or another type of display device.

As will be explained in more detail below, in accordance with the techniques of the disclosure, GPU 12 may be configured to predict an execution time of a compute kernel and based on the predicted execution time, make a power management decision, such as determining whether to change a DCVS operating performance point (OPP) or to put GPU 12 into an inter-domain power collapse mode. GPU 12 may predict the execution time of the compute kernel by estimating an average execution clock cycles per workgroup for the compute kernel and by estimating a total number of execution cycles for the compute kernel based on the average execution clock cycles per workgroup for the compute kernel and a total number of workgroups in the kernel. In other implementations, a kernel driver running on processor 16 may be configured to predict the execution time of the compute kernel and based on the predicted execution time, make the power management decision for GPU 12.

To estimate the average execution clock cycles per workgroup for the compute kernel, GPU 12 may estimate the average execution clock cycles per workgroup for the compute kernel at a kernel level, a sub-kernel level, or utilizing a combination of both. Kernel-level profiling may provide for a relatively simple implementation in the kernel driver, without the need for special hardware support, produce higher accuracy in common cases, and not require any need for access to kernel source. Kernel-level profiling, however, may also produce lower accuracy for some specific use-cases and may only work after a first run of the same kernel. Additionally, kernel-level profiling may require a more complicated implementation when integrated with DCVS.

Sub-kernel level-profiling may avoid the need for an additional book keeping mechanism for each kernel and may work even on the first run of the kernel. Sub-kernel level profiling may also allow for a more seamless integration with DCVS. Sub-kernel level profiling, however, may require special power management hardware, produce lower accuracy than kernel level profiling for common use-cases, and require more initial implementation effort (but potentially less tuning and overall effort when integrated with DCVS).

Figure 2A:
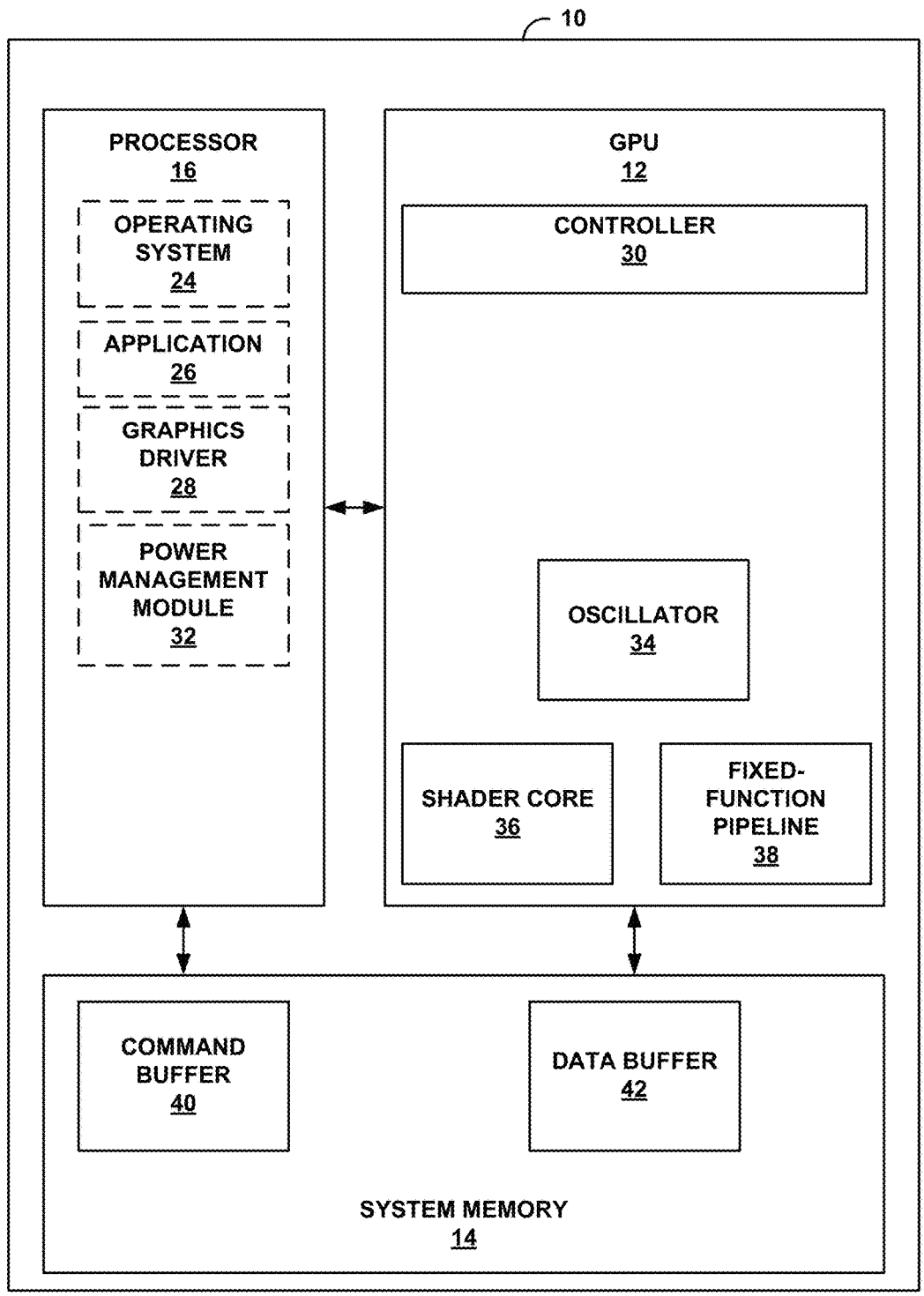
FIGS. 2A and 2B are block diagrams illustrating components of the device illustrated in FIG. 1 in greater detail.

FIG. 2A is a block diagram illustrating components of the device illustrated in FIG. 1 in greater detail. As illustrated in FIG. 2A, GPU 12 includes controller 30, oscillator 34, shader core 36, and fixed-function pipeline 38. Shader core 36 and fixed-function pipeline 38 may together form an execution pipeline used to perform graphics or non-graphics related functions. Although only one shader core 36 is illustrated, in some examples, GPU 12 may include one or more shader cores similar to shader core 36.

The commands that GPU 12 is to execute are executed by shader core 36 and fixed-function pipeline 38, as determined by controller 30 of GPU 12. Controller 30 may be implemented as hardware on GPU 12 or software or firmware executing on hardware of GPU 12. Controller 30 may receive commands that are to be executed from command buffer 40 of system memory 14 or directly from processor 16 (e.g., receive the submitted commands that processor 16 determined should now be executed by GPU 12). Controller 30 may also retrieve the operand data for the commands from data buffer 42 of system memory 14 or directly from processor 16. Controller 30 may determine which commands are to be executed by shader core 36 (e.g., software instructions are executed on shader core 36) and which commands are to be executed by fixed-function pipeline 38 (e.g., commands for units of fixed-function pipeline 38).

In some examples, commands and/or data from one or both of command buffer 40 and data buffer 42 may be part of a local memory of GPU 12. For instance, GPU 12 may include an instruction cache and a data cache that stores commands from command buffer 40 and data from data buffer 42, respectively. In these examples, controller 30 may retrieve the commands and/or data from the local cache.

Shader core 36 and fixed-function pipeline 38 may transmit and receive data from one another. For instance, some of the commands that shader core 36 executes may produce intermediate data that are operands for the commands that units of fixed-function pipeline 38 are to execute. Similarly, some of the commands that units of fixed-function pipeline 38 execute may produce intermediate data that are operands for the commands that shader core 36 is to execute. In this way, the received data is progressively processed through units of fixed-function pipeline 38 and shader core 36 in a pipelined fashion. Hence, shader core 36 and fixed-function pipeline 38 may be referred to as implementing an execution pipeline.

In general, shader core 36 allows for various types of commands to be executed, meaning that shader core 36 is programmable and provides users with functional flexibility because a user can program shader core 36 to perform desired tasks in most conceivable manners. Shader core 36 may be used for performing graphics operations or compute operations depending on how shader core 36 is configured or depending on what code shader core 36 is executing. The fixed-function units of fixed-function pipeline 38, however, are hardwired for the manner in which the fixed-function units perform tasks. Accordingly, the fixed-function units may not provide much functional flexibility.

As also illustrated in FIG. 2A, GPU 12 includes oscillator 34. Oscillator 34 outputs a clock signal that sets the time instances when shader core 36 and/or units of fixed-function pipeline 38 execute commands. Although oscillator 34 is illustrated as being internal to GPU 12, in some examples, oscillator 34 may be external to GPU 12. Also, oscillator 34 need not necessarily just provide the clock signal for GPU 12, and may provide the clock signal for other components as well.

Oscillator 34 may generate a square wave, a sine wave, a triangular wave, or other types of periodic waves. Oscillator 34 may include an amplifier to amplify the voltage of the generated wave, and output the resulting wave as the clock signal for GPU 12.

In some examples, on a rising edge or falling edge of the clock signal outputted by oscillator 34, shader core 36 and each unit of fixed-function pipeline 38 may execute one command. In some cases, a command may be divided into sub-commands, and shader core 36 and each unit of fixed-function pipeline 38 may execute a sub-command in response to a rising or falling edge of the clock signal. For instance, the command of A+B includes the sub-commands to retrieve the value of A and the value of B, and shader core 36 or fixed-function pipeline 38 may execute each of these sub-commands at a rising edge or falling edge of the clock signal.

The rate at which shader core 36 and units of fixed-function pipeline 38 execute commands may affect the power consumption of GPU 12. For example, if the frequency of the clock signal outputted by oscillator 34 is relatively high, shader core 36 and the units of fixed-function pipeline 38 may execute more commands within a time period as compared the number of commands shader core 36 and the units of fixed-function pipeline 38 would execute for a relatively low frequency of the clock signal. However, the power consumption of GPU 12 may be greater in instances where shader core 36 and the units of fixed-function pipeline 38 are executing more commands in the period of time (due to the higher frequency of the clock signal from oscillator 34) than compared to instances where shader core 36 and the units of fixed-function pipeline 38 are executing fewer commands in the period of time (due to the lower frequency of the clock signal from oscillator 34). Moreover, higher frequencies typically require higher supply voltages, which further increases the power consumption of GPU 12.

As described above, processor 16 may offload tasks to GPU 12 due to the massive parallel processing capabilities of GPU 12. For instance, GPU 12 may be designed with a single instruction, multiple data (SIMD) structure. In the SIMD structure, shader core 36 includes a plurality of SIMD processing elements, where each SIMD processing element executes same commands, but on different data.

A particular command executing on a particular SIMD processing element is referred to as a thread (or a work item for compute workloads). Each SIMD processing element may be considered as executing a different thread/work item because the data for a given thread may be different; however, the thread/work item executing on a processing element is the same command as the command executing on the other processing elements. In this way, the SIMD structure allows GPU 12 to perform many tasks in parallel (e.g., at the same time). For such SIMD structured GPU 12, each SIMD processing element may execute one work item on a rising edge or falling edge of the clock signal.

To avoid confusion, this disclosure uses the term "command" to generically refer to a process that is executed by shader core 36 or units of fixed-function pipeline 38. For instance, a command includes an actual command, constituent sub-commands (e.g., memory call commands), a thread, or other ways in which GPU 12 performs a particular function. Because GPU 12 includes shader core 36 and fixed-function pipeline 38, GPU 12 may be considered as executing the commands.

Also, in the above examples, shader core 36 or units of fixed-function pipeline 38 execute a command in response to a rising or falling edge of the clock signal outputted by oscillator 34. However, in some examples, shader core 36 or units of fixed-function pipeline 38 may execute one command on a rising edge and another, subsequent command on a falling edge of the clock signal. There may be other ways in which to "clock" the commands, and the techniques described in this disclosure are not limited to the above examples.

Because GPU 12 executes commands every rising edge, falling edge, or both, the frequency of clock signal (also referred to as clock rate) outputted by oscillator 34 sets the amount of commands GPU 12 can execute within a certain time. For instance, if GPU 12 executes one command per rising edge of the clock signal, and the frequency of the clock signal is 1 MHz, then GPU 12 can execute one million commands in one second.

As described above, in some cases, GPU 12 may execute submitted commands (e.g., the set of commands that GPU 12 retrieves from command buffer 40) within a set time period. However, the amount of commands in the submitted commands may be variable (i.e., the number of commands that GPU 12 needs to execute within the time period need not be constant for every set of submitted commands).

For instance, as illustrated in FIG. 2A, processor 16 executes application 26, as illustrated by the dashed boxes. During execution, application 26 generates commands that are to be executed GPU 12, including commands that instruct GPU 12 to retrieve and execute shader programs (e.g., vertex shaders, fragment shaders, compute shaders for non-graphics applications, and the like). In addition, application 26 generates the data on which the commands operate (i.e., the operands for the commands). Processor 16 stores the generated commands in command buffer 40, and stores the operand data in data buffer 42.

After processor 16 stores the generated commands in command buffer 40, processor 16 makes available the commands for execution by GPU 12. For instance, processor 16 communicates to GPU 12 the memory addresses of a set of the stored commands and their operand data, where GPU 12 is to execute the set of commands, and information indicating when GPU 12 is to execute the set of commands. In this way, processor 16 submits commands to GPU 12 for execution.

As illustrated in FIG. 2A, processor 16 may also execute graphics driver 28. In some examples, graphics driver 28 may be software or firmware executing on hardware or hardware units of processor 16. Graphics driver 28 may be configured to allow processor 16 and GPU 12 to communicate with one another. For instance, when processor 16 offloads graphics or non-graphics processing tasks to GPU 12, processor 16 offloads such processing tasks to GPU 12 via graphics driver 28. For example, when processor 16 outputs information indicating the amount of commands GPU 12 is to execute, graphics driver 28 may be the unit of processor 16 that outputs the information to GPU 12. Graphics driver 28 may be divided into two components, a kernel driver and a user-space driver. The techniques of this disclosure, which relate to compute workloads, may be implemented in some examples by the kernel driver of the graphics driver.

As additional examples, application 26 produces graphics data and graphics commands, and processor 16 may offload the processing of this graphics data to GPU 12. In this example, processor 16 may store the graphics data in data buffer 42 and the graphics commands in command buffer 40, and graphics driver 28 may instruct GPU 12 when to retrieve the graphics data and graphics commands from data buffer 42 and command buffer 40, respectively, from where to retrieve the graphics data and graphics commands from data buffer 42 and command buffer 40, respectively, and when to process the graphics data by executing one or more commands of the set of commands.

Also, application 26 may require GPU 12 to execute one or more shader programs. For instance, application 26 may require shader core 36 to execute a vertex shader and a fragment shader to generate images that are to be displayed (e.g., on display 18 of FIG. 1). Graphics driver 28 may instruct GPU 12 when to execute the shader programs and instruct GPU 12 with where to retrieve the graphics data from data buffer 42 and where to retrieve the commands from command buffer 40 or from other locations in system memory 14. In this way, graphics driver 28 may form a link between processor 16 and GPU 12.

Graphics driver 28 may be configured in accordance to an application processing interface (API); although graphics driver 28 does not need to be limited to being configured in accordance with a particular API. In an example where device 10 is a mobile device, graphics driver 28 may be configured in accordance with the OpenGL ES API. The OpenGL ES API is specifically designed for mobile devices. In an example where device 10 is a non-mobile device, graphics driver 28 may be configured in accordance with the OpenGL API.

In the example techniques described in this disclosure, there may be various ways in which processor 16 may determine the amount of commands that GPU 12 is to execute within the time period. For example, the amount of commands in the submitted commands may be based on the commands needed to render one frame of the user-interface or gaming application. For the user-interface example, GPU 12 may need to execute the commands needed to render one frame of the user-interface within the vsync window (e.g., 16 ms) to provide a jank-free user experience. If there is a relatively large amount of content that needs to be displayed, then the amount of commands may be greater than if there is a relatively small amount of content that needs to be displayed.

To ensure that GPU 12 is able to execute the submitted commands within the set time period, controller 30 may adjust the frequency (i.e., clock rate) and/or voltage of the clock signal that oscillator 34 outputs. However, to adjust the clock rate of the clock signal such that the clock rate is high enough to allow GPU 12 to execute the submitted commands within the set time period, controller 30 may receive information indicating the performance level needed to execute the set of commands (e.g., submitted commands) within the time period, and determine the clock rate based on the received information.

For instance, if controller 30 receives information indicating what the performance level is needed based on how many commands GPU 12 is to execute within the time period, either as an absolute value or a relative value, prior to GPU 12 executing the commands, controller 30 may determine whether to increase or decrease the frequency of the clock signal. Controller 30 may increase the clock rate if controller 30 determines that a higher performance level (e.g., higher clock rate) is needed to execute the commands within the time period than the current clock rate for timely execution. To reduce power consumption, controller 30 may decrease the clock rate if controller 30 determines that as high as a performance level is not needed to execute the commands within the time period (i.e., a lower clock rate is sufficient to timely execute the commands).

In the techniques described in this disclosure, controller 30 may determine the performance level based on information received from processor 16 that indicates the performance level. The performance level is based on an amount of commands GPU 12 is to execute within a time period. Controller 30 may then increase or decrease the frequency of the clock signal outputted by oscillator 34 based on the determination of the performance level. In this manner, the frequency of the clock signal may increase before GPU 12 is to execute the commands that were used to determine the performance level of GPU 12.

Because application 26 generates the commands that GPU 12 is to execute, application 26 may determine the amount of commands GPU 12 is to execute within a set time period, and may, therefore, be able to determine the performance level of GPU 12. Processor 16 may then output information indicating the performance level of GPU 12, where the performance level is based on an amount of commands GPU 12 is to execute within the set time period.

However, in some cases, while application 26 may generate the commands and the operand data, application 26 may not have been designed to determine the performance level of GPU 12. In some examples, if application 26 does not determine the performance level of GPU 12 or does not cause processor 16 to output information indicating the performance level, GPU 12 may still be able to receive information indicating the performance level needed to timely execute the commands that were used to determine the performance level. As illustrated in FIG. 2A, processor 16 also executes operating system 24. Operating system 24 is configured to manage resources of processor 16, such as allocate memory resources and handle the transfer of commands and data to and from memory, such as the memory that includes command buffer 40 or data buffer 42 (system memory 14 in the example illustrated in FIG. 2A).

Therefore, operating system 24 may be configured to determine the amount of commands GPU 12 is to execute because operating system 24 determines the memory resources needed to store the commands and operand data in command buffer 40 and data buffer 42. Moreover, when processor 16 submits the commands, it is operating system 24 that determines the memory addresses for where GPU 12 is to retrieve commands from command buffer 40 and operands data from data buffer 42. Accordingly, operating system 24 may determine the amount of commands GPU 12 is to execute within a time period. Operating system 24 may determine the performance level of GPU 12 based on the determined amount of commands GPU 12 is to execute within a time period, and cause processor 16 to output the information indicating the performance level.

There may be other ways in which processor 16 may utilize application 26 and/or operating system 24 to proactively determine the performance level of GPU 12 before GPU 12 executes commands that were used to determine the performance level of GPU 12. The following provides two additional examples for how processor 16 may utilize information from application 26 and/or operating system 24 to determine the performance level of GPU 12.

As a first example for how processor 16 proactively determines the expected performance level of GPU 12, assume that application 26 is a video game such as, but not required to be, one that produces high definition graphics, and device 10 is a mobile device. In this example, if a video player is displaying the output of application 26 when device 10 is in the portrait orientation, application 26 may need to submit commands to GPU 12 to render only a small area of display 18. However, when a user rotates device 10 to the landscape orientation for a transitory period of a few frame, GPU 12, at the current clock rate, may not be able to produce a frame within 16 ms.

In this example, operating system 24 may notify application 26 about a change in the orientation, and processor 16, in turn, may determine the performance level of GPU 12. For instance, as illustrated in FIG. 2A, processor 16 may execute power management module 32; however, power management module 32 may be hardware of processor 16 or a combination of hardware and software or firmware. In one example of frequency management performed by power management module 32, power management module 32 may determine that application 26 will be increasing the amounts of commands GPU 12 is to execute, and in turn may determine a performance level needed by GPU 12 before GPU 12 executes the commands, and may be even before GPU 12 receives the commands.

Power management module 32 may then indicate to graphics driver 28 that a performance level of GPU 12 is to increase. Graphics driver 28 may then output information indicating the expected performance level of GPU 12, and controller 30 of GPU 12 may in turn increase the frequency of oscillator 34.

In some examples, the techniques implemented by power management module 32 may be dynamic voltage and clock scaling (DVCS) or dynamic clock and voltage scaling (DCVS) control that provide control based on running average, variant, and/or trend. One example way in which power management module 32 may implement frequency management is described in U.S. Pat. No. 8,650,423.

In general, power management module 32 may maintain running statistics of the workload of GPU 12. For instance, power management module 32 may maintain one or more of a running average busy and/or idle duration, an idle/busy ratio, a variance of the running average, and a trend of the running average of the workload. Based on the statistics of the workload of GPU 12, power management module 32 may continuously determine the frequency of the clock signal outputted by oscillator 34.

However, there may be some latency in power management module 32 determining the frequency of the clock signal. For instance, power management module 32 utilizes the recently executed commands to determine what the clock rate should have been for the recently executed commands. But, by the time power management module 32 determines the clock rate, GPU 12 has already started to execute the next commands. Also, for low end examples of GPUs, the latency may be relatively high. Accordingly, the clock rate determination from power management module 32 may be slightly delayed from what the clock rate should actually be.

In some examples, processor 16 may utilize the outputs from power management module 32 to adjust the frequency of the clock signal outputted by oscillator 34. For instance, based on information received from power management module 32 of the performance level of GPU 12, controller 30 may determine and set the clock rate of oscillator 34 to the determined clock rate.

Power management module 32 may additionally be configured to power collapse some hardware blocks of GPU 12 that contribute to the power consumption of GPU 12. For example, for graphics data at a low frame rate (e.g. 15 frames per second), power management module 32 may collapse certain hardware blocks of GPU 12 because GPU 12 does not need to utilize those blocks for data processing in order to meet a desired performance level. For graphics data at a higher frame rate (e.g. 30 frames per second), however, power management module 32 may need all available power blocks active in order for GPU 12 to meet a desire performance level.

The above description of power management module 32 has thus far focused on how power management module 32 may implement aspects of DCVS and power collapse for graphics workloads. According to the techniques of this disclosure, power management module 32 may also implement DCVS and power collapse for non-graphics workloads, e.g. compute workloads. As will be described in more detail below, power management module 32 may predict an execution time of a compute kernel that is to be executed by GPU 12, and based on the predicted execution time, make a power management decision for GPU 12. The power management decision may, for example, include adjusting a frequency and/or voltage of oscillator 34 in the manner described above. The power management decision may, for example, also include adjusting operating parameters of resources, such as a memory, that are shared by GPU 12 but separate from GPU 12.

Power management module 32 may also power collapse some, but not all, hardware blocks of GPU 12 based on the predicted execution time. Compute workloads executed on GPU 12 may not use some hardware blocks with considerable contribution to the power consumption of GPU 12, and therefore, GPU 12 may be able to reduce power consumption by power collapsing those blocks. In this regard, power collapsing some, but not all, hardware blocks of GPU 12 may be considered to be a different mode than modes in which all of GPU 12 is powered down. According to the techniques of this disclosure, power management module 32 may determine if blocks of GPU 12 should be power collapsed based on a predicted execution time of a compute kernel. For small execution times, the power collapsed blocks of GPU 12 may need to be turned on again quickly, and changing rapidly from a power collapsed state to an active state may decrease performance, and in some cases even increase power consumption.

As introduced above, GPU 12 may predict a kernel execution time by estimating an average workgroup execution time, and based on the estimated average workgroup execution time, predict a kernel execution time. The predicted kernel execution time may, for example, correspond to the average workgroup execution time multiplied by the number of workgroups in the kernel. GPU 12 may, for example, estimate the average workgroup execution time by implementing either kernel-level profiling or sub-kernel (e.g. workgroup) level profiling.

Figure 2B:
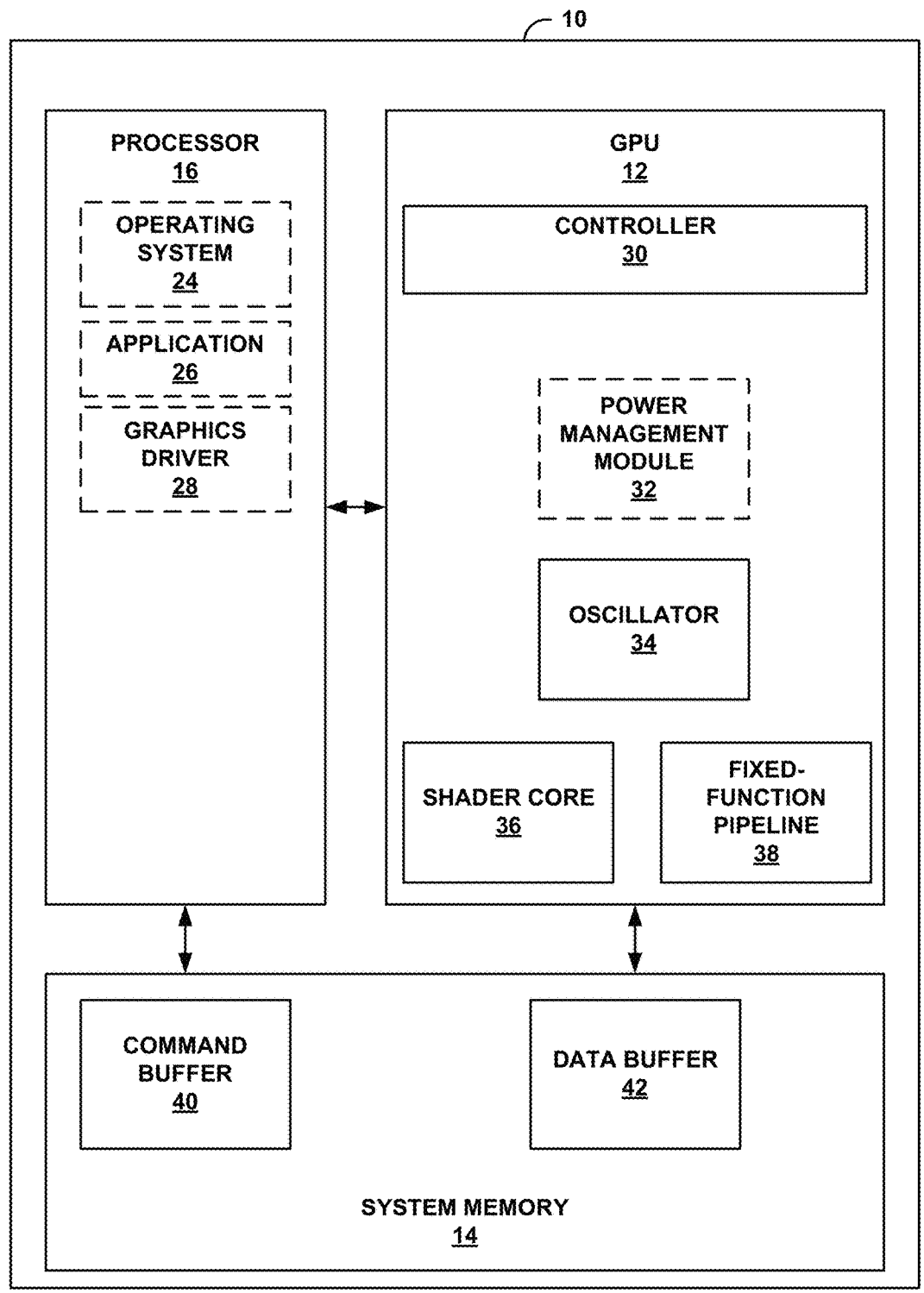

FIG. 2B shows an alternative implementation of device 10. In the implementation of device 10, power management module 32 is located in GPU 12 instead of processor 16. Power management module 32 may, for example, be implemented as hardware on GPU 12 or software or firmware executing on hardware of GPU 12. In some implementations, power management module 32 may be implemented as firmware executed by a dedicated processor inside GPU 12. Device 10 as shown in FIG. 2B is functionally equivalent to device 10 shown in FIG. 2A other than for the location of power management module 32.

Figure 3:
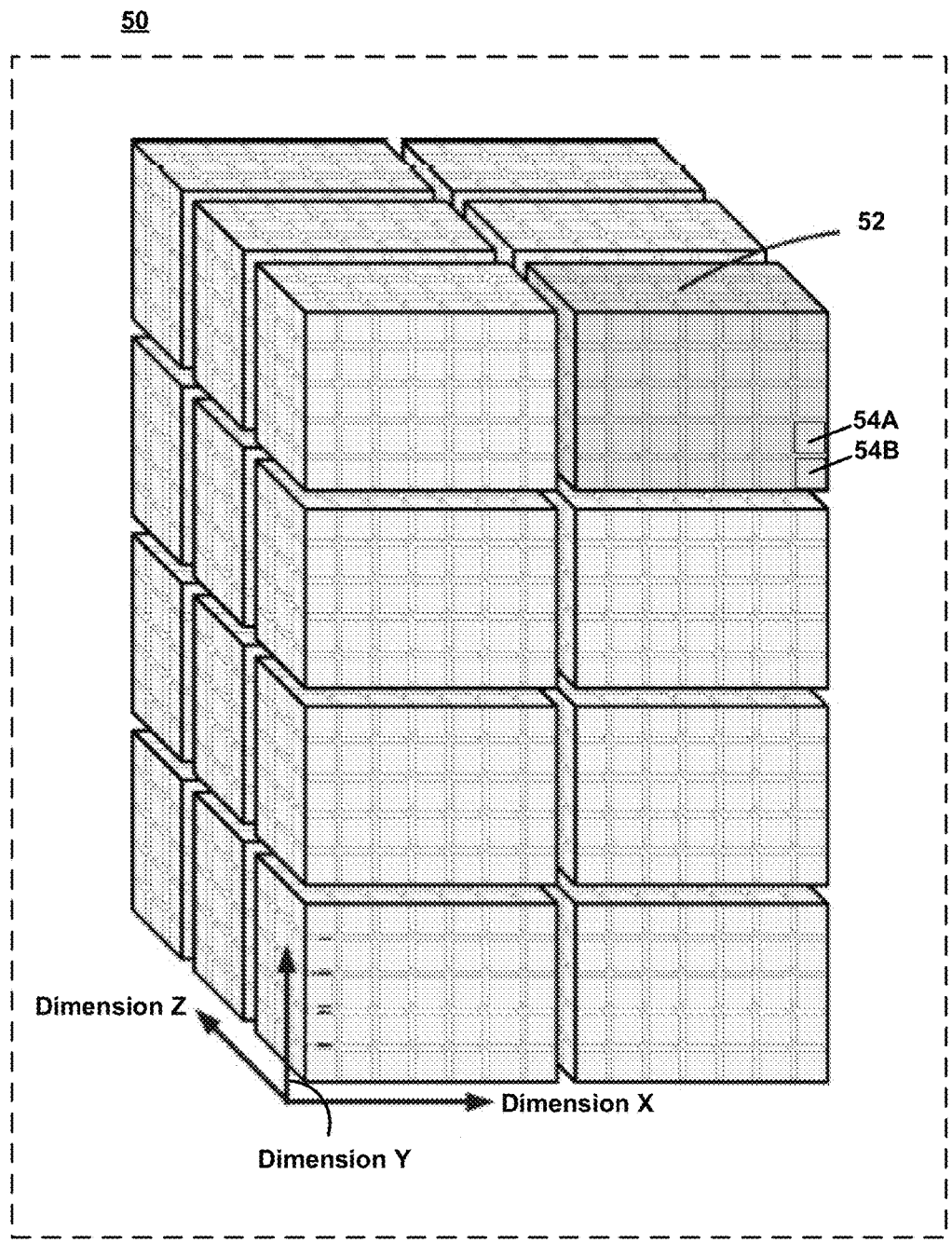
FIG. 3 is a graphical representation of a compute kernel.

FIG. 3 is a graphical representation of kernel 50. Kernel 50 includes a plurality of workgroups, which are shown in FIG. 3 as three-dimensional rectangular boxes. Workgroup 52 represents one of the plurality of workgroups of kernel 50, and is shown in FIG. 3. Each workgroup in kernel 50 includes a plurality work items, which are shown in FIG. 3 as smaller cubes. Work items 54A and 54B represent two of the work items of workgroup 52. Kernel 50 in FIG. 3 is shown as a three-dimensional structure, similar to the three-dimensional structures used in OpenCL and other software frameworks.

Figure 4:
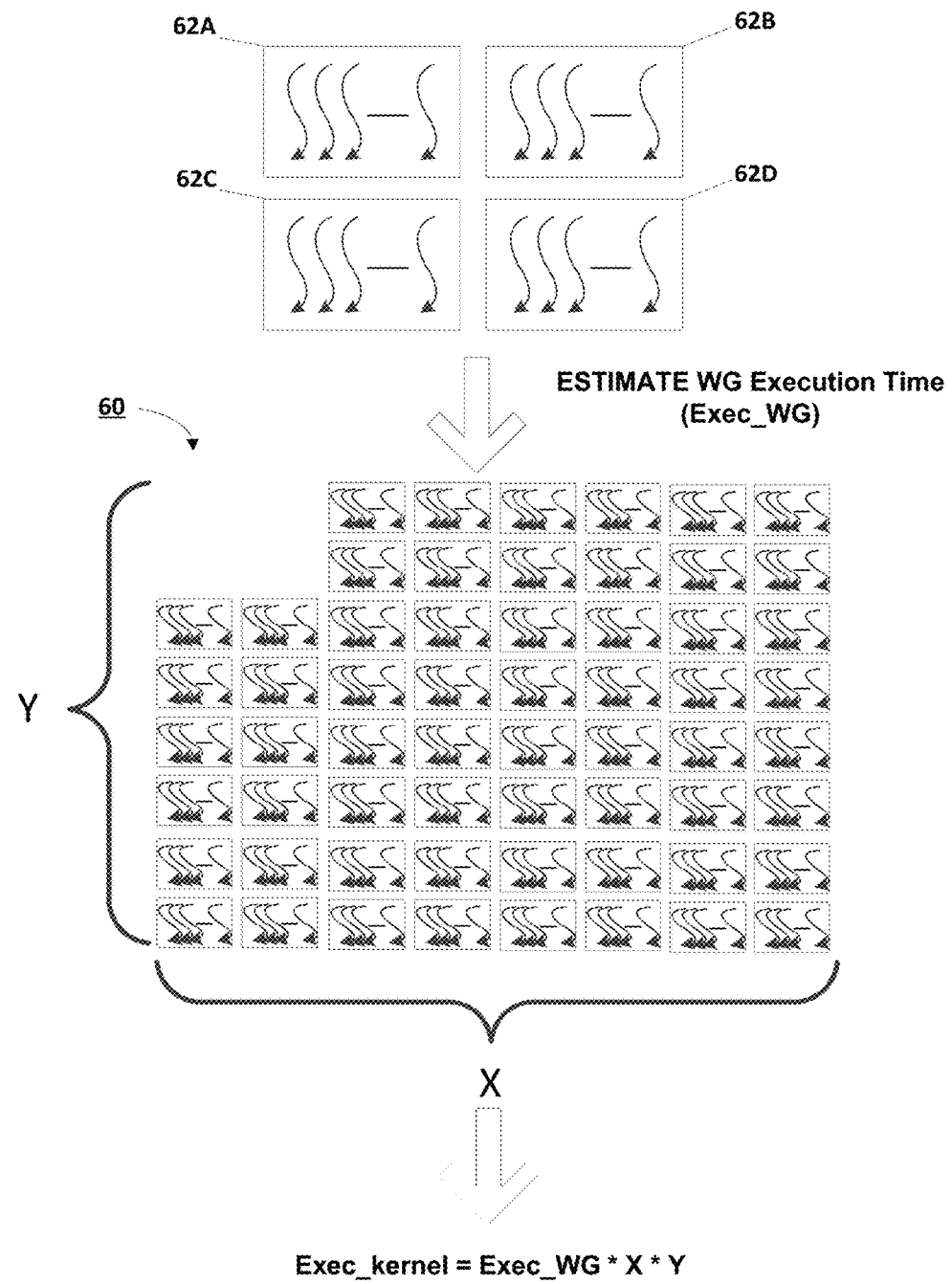
FIG. 4 is a graphical representation of sub-kernel level profiling for determining an average workgroup execution time.

FIG. 4 is a graphical representation of sub-kernel level profiling for determining an average workgroup execution time. In the example of FIG. 4, kernel 60 includes a plurality of workgroups, which are shown in FIG. 4 as rectangles. Each of the workgroups includes a plurality of work items, which are shown as squiggly arrows within each rectangle. The number of workgroups in kernel 60 may be expressed as X*Y*Z, with Z being assumed to be equal to 1 for the example of FIG. 4, but in other examples Z may be an integer greater than 1. To perform sub-kernel level profiling, processor 16 or GPU 12 may be configured to determine a workgroup execution time for a subset of the workgroups in kernel 60. In the example of FIG. 4, processor 16 or GPU 12 may be configured to determine a workgroup execution time by profiling workgroups 62A-62D (workgroups 62). Processor 16 or GPU 12 may, for example, determine an average workgroup execution time for workgroups 62. Processor 16 or GPU 12 can determine an estimated kernel execution time (Exec_kernel in FIG. 4) based on the average workgroup execution time (Exec_WG in FIG. 4) and the number of workgroups in the kernel (X*Y in FIG. 4).

In the example of FIG. 4, processor 16 or GPU 12 predicts the execution of time for kernel 60 based on profiling workgroups of kernel 60. Based on the predicted execution time for kernel 60, which is determined based on the profiling of workgroups 62, processor 16 or GPU 12 makes a power management decision for how GPU 12 will process the remaining workgroups of kernel 60, i.e. the workgroups processed after workgroups 62.

Figure 5:
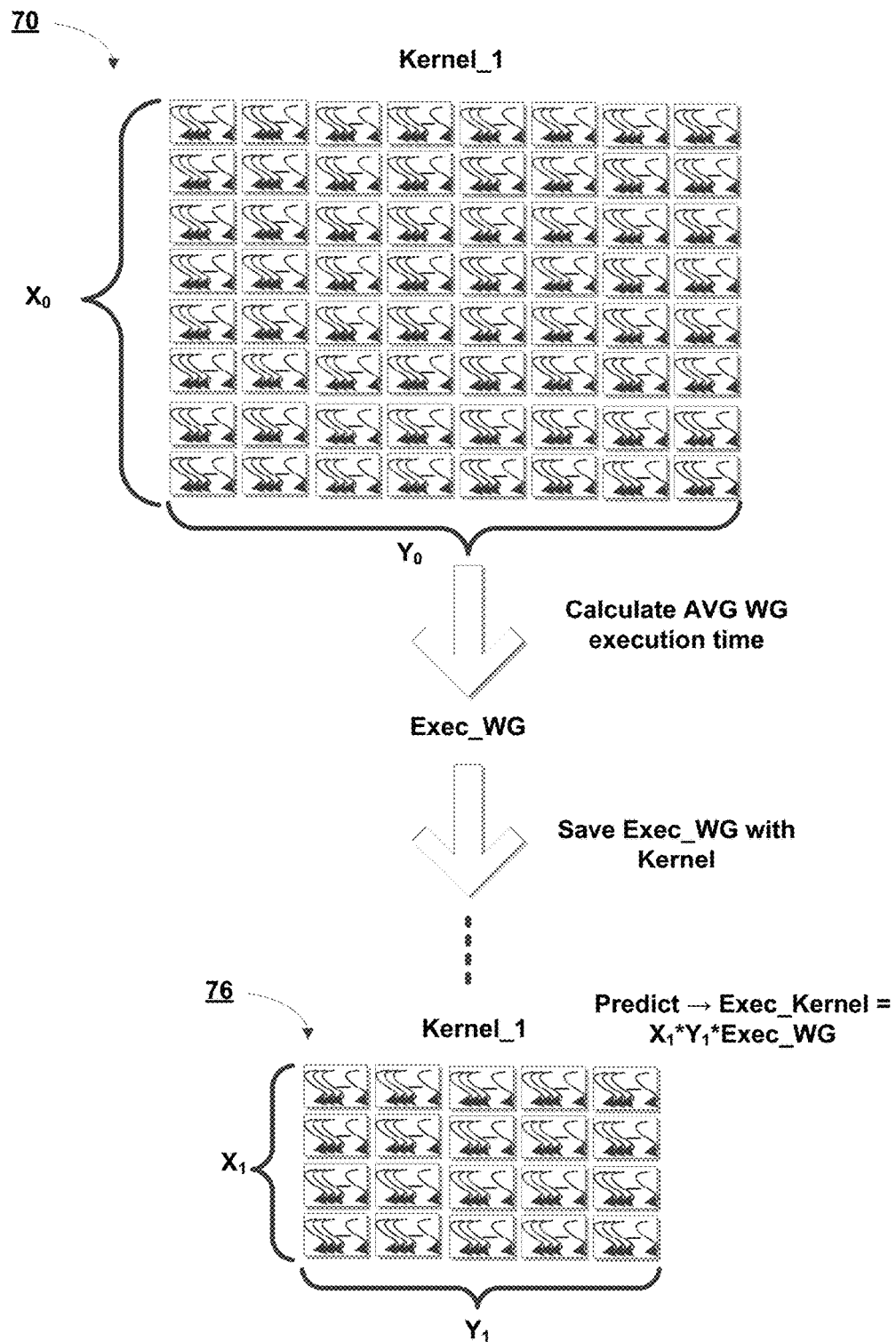
FIG. 5 is a graphical representation of kernel level profiling for determining an average workgroup execution time.

FIG. 5 is a graphical representation of kernel level profiling for determining an average workgroup execution time. In the example of FIG. 5, kernel 70 includes a plurality of workgroups, which are shown in FIG. 5 as rectangles within kernel 70. Each of the workgroups includes a plurality of work items, which are shown as squiggly arrows within each rectangle. The number of workgroups in kernel 70 may be expressed as $X_0*Y_0*Z_0$, with $Z_0$ being assumed to be equal to 1 for the example of FIG. 5, but in other examples $Z_0$ may be an integer greater than 1. To perform kernel level profiling, processor 16 or GPU 12 may be configured to determine a workgroup execution time for all workgroups in kernel 70. Processor 16 or GPU 12 may, for example, determine an average workgroup execution time (Exec_WG) for the workgroups of kernel 70.

For a second kernel 76, processor 16 or GPU 12 can determine an estimated kernel execution time (Exec_kernel in FIG. 5) based on the average workgroup execution time (Exec_WG in FIG. 4) determined for kernel 70 and the number of workgroups in second kernel 76 ($X_1*Y_1$ in FIG. 5). In the example of FIG. 5, second kernel 76 represents a second execution of the same kernel used for kernel 70. In some examples, characteristics of second kernel 76, such as input data size or number of workgroups in second kernel 76, may be different than kernel 70, but the kernel code for kernel 70 and second kernel 76 may be the same. In other examples, the profile determined for kernel 70 may only be used for second kernel 76 if second kernel 76 has the same work group configuration as kernel 70. In such an example, separate instances of the same kernel that have different workgroup configurations may be associated with different profiles.

In the example of FIG. 5, processor 16 or GPU 12 predicts the execution of time for second kernel 76 based on profiling workgroups of kernel 70. Based on the predicted execution time for second kernel 76, processor 16 or GPU 12 makes a power management decision for how GPU 12 will process the workgroups of second kernel 76.

Figure 6:
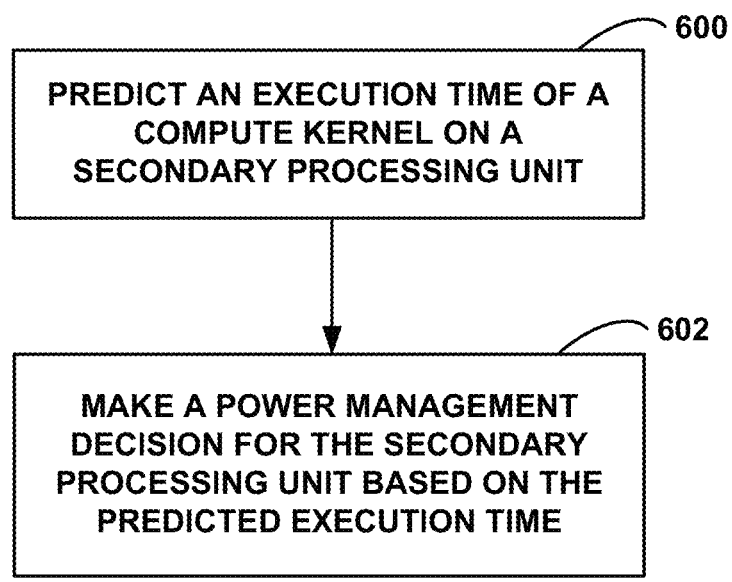
FIG. 6 is a flow diagram illustrating techniques of this disclosure for prediction-based power management of compute workloads.
Figure 7:
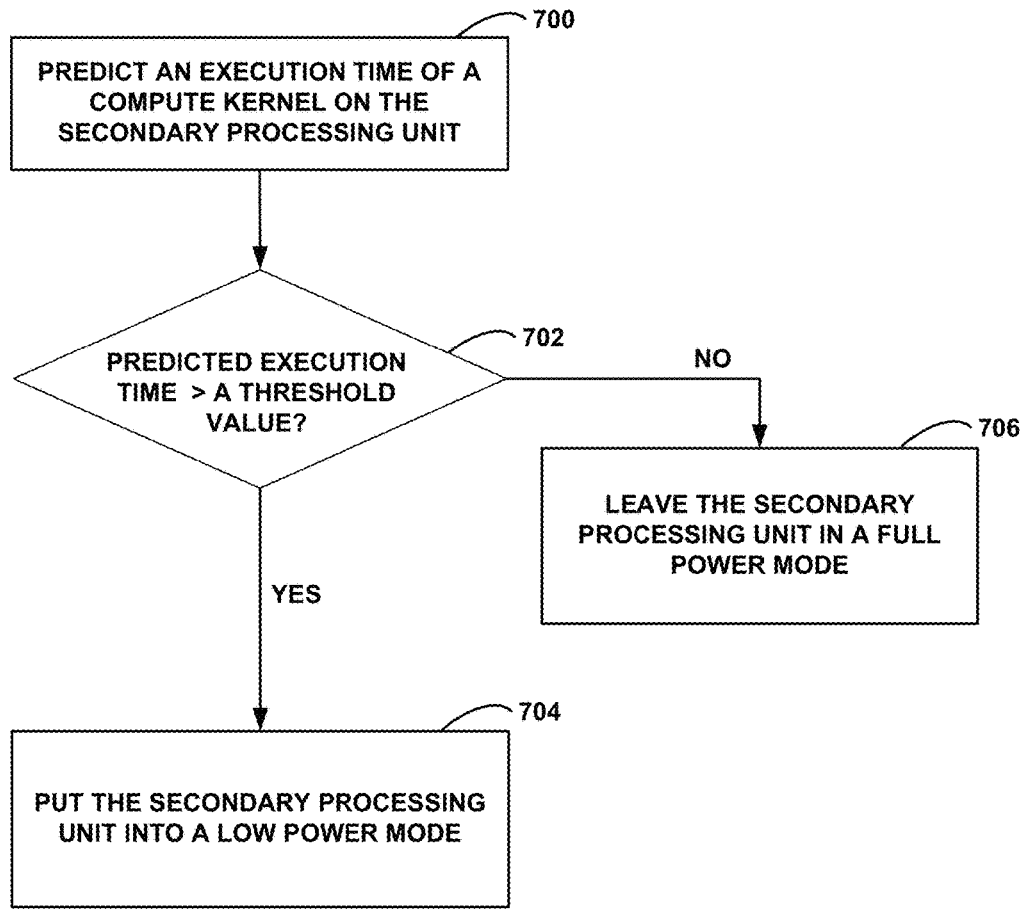
FIG. 7 is a flow diagram illustrating techniques of this disclosure for prediction-based power management of compute workloads.

FIGS. 6 and 7 are flow diagrams illustrating techniques of this disclosure for prediction-based power management of compute workloads. The techniques of FIGS. 6 and 7 will be described with reference to a system that includes a primary processing unit and a secondary processing unit. In this context, a primary processing unit generally refers to a processing unit that controls, either wholly or partially, the execution of workloads on a secondary processing unit. For example, the primary processing unit may issue commands to the secondary processing unit, through a driver of the secondary processing unit, which cause the secondary processing unit to process a workload. In many examples, the primary processing unit may be more of a general purpose processor while the secondary processor may be more of a special purpose processor.

The primary processing unit may, for example, correspond to processor 16 of FIGS. 1 and 2, while the secondary processing unit may correspond to GPU 12 of FIGS. 1 and 2. While the techniques of this disclosure have generally been described with respect to CPUs and GPUs, it should be understood that the techniques of this disclosure may be implemented with other types of secondary processing units and may be of particular benefit for secondary processing units that support data parallelism and for which there is going to be a high correlation or similarity between the execution time of the instructions on different, similarly sized blocks of data (in this case workgroups).

In the example of FIG. 6, the system predicts an execution time of a compute kernel on the secondary processing unit (600). To predict the execution time of the compute kernel, the system may estimate an average execution clock cycles per workgroup for the compute kernel. To predict the execution time of the compute kernel, the system may additionally estimate a total number of execution cycles for the compute kernel based on the average execution clock cycles per workgroup for the compute kernel and a total number of workgroups in the kernel. To estimate the average execution clock cycles per workgroup for the compute kernel, the system may estimate the average execution clock cycles per workgroup for the compute kernel at a kernel level or at a sub-kernel level, in the manners described above.

Based on the predicted execution time, the system makes a power management decision for the secondary processing unit (602). The power management decision for the secondary processing unit may, for example, include putting the secondary processing unit into a low power mode, such as an inter-domain power collapse mode or other such mode. The power management decision may alternatively or additionally include dynamically scaling one or both of a clock frequency or a voltage for the secondary processing unit.

In the example of FIG. 7, the system predicts an execution time of a compute kernel on the secondary processing unit (700). Based on the predicted execution time, the system makes a power management decision for the secondary processing unit. For example, in response to the predicted execution time being greater than a threshold value (702, YES), the system may put the secondary processing unit into a low power mode such as an inter-domain power collapse mode, or other such low power mode (704). In response to the predicted execution time being less than a threshold value (702, NO), the system may leave the secondary processing unit in a full power mode (706). To predict the execution time of the compute kernel, the system may estimate an average execution clock cycles per workgroup for the compute kernel.

To predict the execution time of the compute kernel, the system may estimate a total number of execution cycles for the compute kernel based on the average execution clock cycles per workgroup for the compute kernel and a total number of workgroups in the kernel. To estimate the average execution clock cycles per workgroup for the compute kernel, the system may estimate the average execution clock cycles per workgroup for the compute kernel at a kernel level or a sub-kernel level as described above.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of processing data, the method comprising:
   executing a compute kernel on a graphics processing unit of a mobile, touchscreen device, wherein the compute kernel comprises non-graphics workloads;
   based on the executing of the compute kernel on the graphics processing unit, determining an average execution clock cycles per workgroup for the compute kernel;
   based on the executing of the compute kernel on the graphics processing unit, predicting, by a primary processing unit of the mobile, touchscreen device, an execution time of the compute kernel on the graphics processing unit, wherein predicting the execution time of the compute kernel further comprises estimating a total number of execution cycles for the compute kernel based on the average execution clock cycles per workgroup for the compute kernel and a total number of workgroups in the compute kernel; and
   causing, by the primary processing unit, the graphics processing unit to operate in a low power mode in response to the predicted execution time being greater than a threshold value.

2. The method of claim 1,
   wherein the low power mode comprises power collapsing one or more hardware blocks of the graphics processing unit.

3. The method of claim 1, wherein the one or more hardware blocks of the graphics processing unit comprise hardware blocks only used for graphics processing.

4. The method of claim 1, wherein the low power mode comprises dynamically scaling one or both of a clock frequency or a voltage for the graphics processing unit.

5. The method of claim 1, wherein predicting the execution time of the compute kernel further comprises estimating an average execution clock cycles per workgroup for the compute kernel.

6. The method of claim 1, further comprising:
   estimating the average execution clock cycles per workgroup for the compute kernel by estimating the average execution clock cycles per workgroup for the compute kernel at a kernel level; and
   executing a second kernel, by the graphics processing unit, in the lower power mode.

7. The method of claim 1, further comprising estimating the average execution clock cycles per workgroup for the compute kernel by estimating the average execution clock cycles per workgroup for the compute kernel at a sub-kernel level; and
   executing a portion of the compute kernel, by the graphics processing unit, in the lower power mode.

8. A mobile device for processing data, the device comprising:
   a memory;
   a touchscreen display;
   a graphics processing unit configured to generate graphics data for the touchscreen display; and
   a processing unit configured to:
   cause a compute kernel to be executed on the graphics processing unit, wherein the compute kernel comprises non-graphics workloads;
   based on the executing of the compute kernel on the graphics processing unit, determine an average execution clock cycles per workgroup for the compute kernel;
   based on the executing of the compute kernel on the graphics processing unit, predict an execution time of the compute kernel on the graphics processing unit, wherein to predict the execution time of the compute kernel, the processing unit is further configured to estimate a total number of execution cycles for the compute kernel based on the average execution clock cycles per workgroup for the compute kernel and a total number of workgroups in the compute kernel; and
   cause the graphics processing unit to operate in a low power mode in response to the predicted execution time being greater than a threshold value.

9. The device of claim 8, wherein the low power mode comprises a power collapse mode where one or more hardware blocks of the graphics processing unit are power collapsed.

10. The device of claim 9, wherein the one or more hardware blocks of the graphics processing unit comprise hardware blocks only used for graphics processing.

11. The device of claim 8, wherein the low power mode comprises dynamically scaling one or both of a clock frequency or a voltage for the graphics processing unit.

12. The device of claim 8, wherein to predict the execution time of the compute kernel, estimate an average execution clock cycles per workgroup for the compute kernel.

13. The device of claim 8, wherein the processing unit is further configured to:
   to determine the average execution clock cycles per workgroup for the compute kernel, estimate the average execution clock cycles per workgroup for the compute kernel at a kernel level; and
   execute a second kernel, by the graphics processing unit, in the lower power mode.

14. The device of claim 8, wherein the processing unit is further configured to:

to determine the average execution clock cycles per workgroup for the compute kernel, the processing unit is further configured to estimate the average execution clock cycles per workgroup for the compute kernel at a sub-kernel level; and execute a portion of the compute kernel, by the graphics processing unit, in the lower power mode.

* * * * *